United States Patent [19]

Lolli

[11] 4,441,950

[45] Apr. 10, 1984

[54] UNIVERSAL FILE WITH INNER GLUING BACK FOR THERMAL GLUING SYSTEMS

[76] Inventor: Carla P. Lolli, Gansbroekstraat 24, Puurs, Belgium, 2658

[21] Appl. No.: 487,241

[22] Filed: Apr. 27, 1983

Related U.S. Application Data

[63] Continuation of Ser. No. 66,394, Aug. 14, 1979, abandoned.

[30] Foreign Application Priority Data

Aug. 22, 1978 [BE] Belgium .............................. 2/57218
Sep. 1, 1978 [BE] Belgium .............................. 2/57251

[51] Int. Cl.[3] ................................................ B32B 3/04

[52] U.S. Cl. .................................... 156/216; 156/250; 156/258; 156/304.3; 156/304.6; 206/450; 281/21 R; 281/29; 281/35; 428/61; 428/343

[58] Field of Search ............... 428/343, 347, 349, 192, 428/194, 61, 62; 156/216, 250, 304.4, 304.7, 258, 304.3, 304.6; 206/450, 1 AD; 281/21 R, 29, 35

[56] References Cited

U.S. PATENT DOCUMENTS

| | | | |
|---|---|---|---|
| 3,437,506 | 4/1969 | Falberg | 281/21 R |
| 3,475,260 | 10/1969 | Stoker | 428/343 X |
| 3,573,146 | 3/1971 | Guinan et al. | 428/343 X |
| 4,054,703 | 10/1977 | Boehm | 428/194 |
| 4,092,450 | 5/1978 | Haren | 428/192 X |
| 4,147,380 | 4/1979 | Nelson | 428/58 X |
| 4,244,069 | 1/1981 | Hale | 206/450 X |

*Primary Examiner*—Thomas J. Herbert, Jr.
*Attorney, Agent, or Firm*—Schwartz, Jeffery, Schwaab, Mack, Blumenthal & Koch

[57] ABSTRACT

Universal file with inner gluing back for thermal gluing systems of the type comprising substantially the combination of a front sheet, a rear sheet, a back and a layer of binding glue applied on the inner side of said back, characterized in that the said back is made of a flexible synthetic material so that such file may be used for binding bundles of documents having various thicknesses.

9 Claims, 8 Drawing Figures

Fig.1
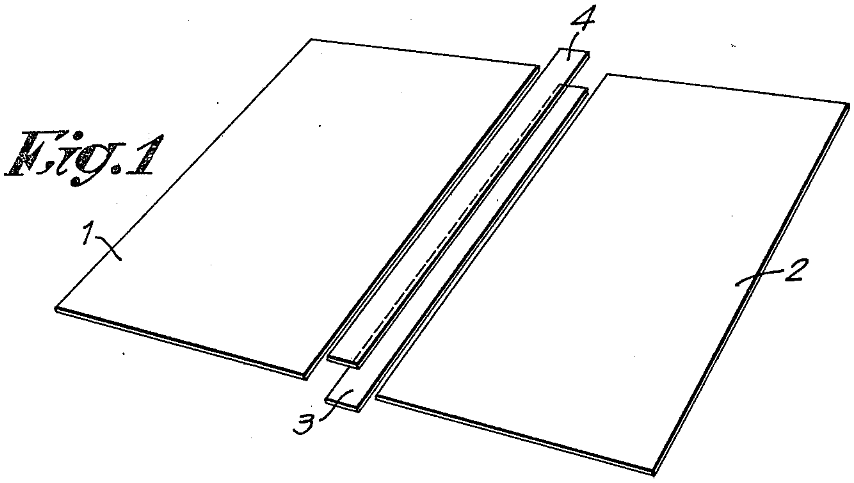
Fig.2
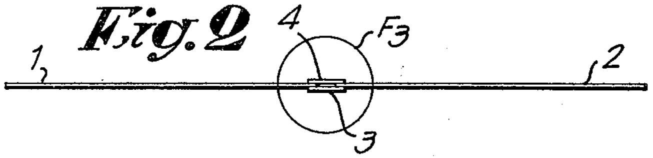
Fig.3
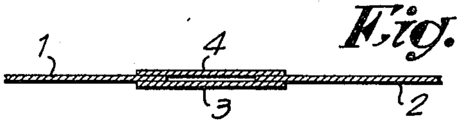
Fig.4
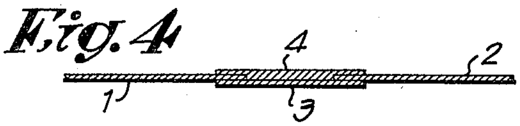
Fig.5
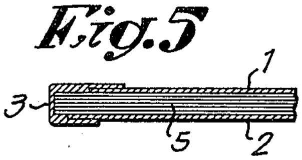
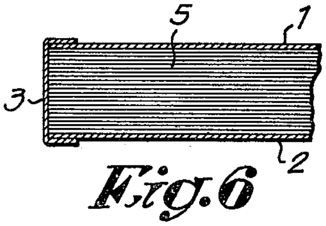
Fig.6
Fig.7
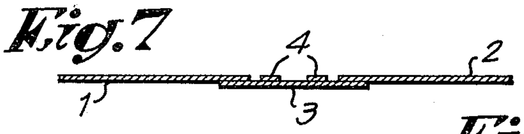
Fig.8
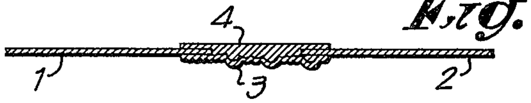

UNIVERSAL FILE WITH INNER GLUING BACK FOR THERMAL GLUING SYSTEMS

This application is a continuation of application Ser. No. 66,394, filed Aug. 14, 1979, now abandoned.

This invention relates to a universal file with an inner gluing back for thermal gluing systems wherein the file is applied around a bundle of documents, papers or similar being bound, the so folded file being intended to be introduced into a heating machine allowing, through heating, to melt the said gluing back against which the sheets, documents or similar are applied, so that this gluing back surrounds the sheets disposed thereon, thereby firmly binding, after cooling, the said sheets with each other, on the one hand, and with the file proper, on the other hand.

Such files are already known, but they have a common drawback in that the back has always determined widths so that, in order to bind a relatively large number of various thick documents, a relatively large number of files with various back widths must be available.

The present invention relates to file which may be universally used, in other words, a file wherein the said back is so provided that it may be applied to a large number of various thicknesses of documents, thereby providing only one file which may be used for these various thicknesses.

This file comprises substantially the combination of a front sheet, a rear sheet, a back and a layer of binding glue on the inner side of said back, said file being characterized in that the said back is made of a flexible synthetic material or so called kraft paper, so that said file may be used for binding bundles of documents having various thicknesses.

The characteristics of this invention will be more clearly apparent from the following description of some preferred embodiments given only by way of example and without any limitation, reference being made to the enclosed drawings in which:

BRIEF DESCRIPTION OF THE DRAWINGS

FIG. 1 is an exploded perspective view of a universal file according to this invention;

FIG. 2 is a diagrammatic cross-section of a file as shown in FIG. 1;

FIG. 3 shows, on an enlarged scale, the portion indicated by F3 in FIG. 2;

FIG. 4 is a view similar to that of FIG. 3, but after the firm gluing of the glue layer on the back proper of the file;

FIG. 5 shows a cross-section through a file according to the invention in which are applied documents having a defined thickness;

FIG. 6 shows a view similar to that of FIG. 5, but wherein the same file is used for binding a thickener pile of documents;

FIGS. 7 and 8 show views similar to that of FIG. 4, but for modified embodiments.

As shown in FIGS. 1 to 6, the most simple embodiment of such file according to the invention comprises substantially a front sheet 1 which may be transparent or not, a rear sheet 2 which may be also made of any material, a back 3 which, according to the invention, is made of a flexible plastic foil, e.g. of polyvinyl chloride or so called kraft paper, and a glue layer which may be at least locally applied on the said back and which is represented separately and diagrammatically by 4 in these Figures.

According to the present invention, the said four items will be assembled to form a file having a front sheet 1, a rear sheet 2 and a back 3 the inner side of which is provided with a suitable glue layer. As shown in the embodiment according to FIGS. 1 to 6, this glue layer will be formed by a strip of material which is readily applied and fastened onto the back during the making of the file, preferably by using the binding strength of the material 4 after heating; however, as shown by way of example in FIG. 7, there is no objection to form the strip 4 with more than only one strip which are applied, e.g. by spraying or similar means before or after having fastened the back 3 on the sheets 1 and 2, it being possible to obtain said fastening by thermowelding, gluing or similar means.

Finally, FIG. 8 shows an example wherein the back 3 is profiled in order to give a well defined flexibility to the file and wherein such ribs may be used, e.g. for limiting defined thicknesses of the file.

Said ribs may be either previously formed in the back 3 or during the making of the file by using electrodes or the like.

The back 3 will be preferably and suitably fastened on the sheets 1 and 2 by means of a welding process; however, there is no objection to apply said back by another method.

As clearly apparent in FIGS. 5 and 6, by using only one file, it is thereby possible to bind documents 5 having different thicknesses by firmly welding the rear edges of said sheets into the glue layer, said operation being carried out, as known per se, by introducing said file with the sheets disposed therein into a suitable heating machine and then by cooling.

It is apparent that, with such a file, the various dimensions, more particularly the width dimensions of the sheets 1 and 2 may be previously and deliberately chosen, or it is also possible, as it is generally the case, to cut said sheets together with the bound sheets 5 to the suitable dimension after curing of the glue layer 4.

Finally, it should be noted that the said back is preferably provided with a reinforcing means made, e.g. of synthetic fibers, cotton threads, wire gauze the like.

The present invention is not at all limited to the embodiments described by way of example and represented in the enclosed drawings, but such file may be made under any shape and dimension without departing from the scope of the invention.

What I claim is:

1. A method of binding bundles of documents having varying thicknesses comprising:

(a) providing a universal file comprising a single-layer front cover sheet having a rear edge and inner and outer surfaces, a single-layer rear cover sheet having a rear edge and inner and outer surfaces, a back sheet of flexible material fastened to the outer surface adjacent the rear edge of each of said cover sheets and a strip of glue having a predetermined width disposed on said back sheet between the inner surfaces of said cover sheets;

(b) inserting a bundle of document sheets between said cover sheets; said bundle of document sheets having a thickness less than the width of said glue strip;

(c) wrapping said backing around the edge of said bundle with one edge of each of said document sheets abutting against said back sheet and said glue;

(d) introducing said file with said bundle of document sheets therein into a heating machine and heating said glue to bond said document sheets to said backing and said front and rear cover sheets and form a bound set of documents, the finished binding for which is formed of only a pair of cover sheets and a back; and (e) cooling the bound documents.

2. The method of claim 1 wherein said front and rear cover sheets are fastened to said back sheet by thermowelding.

3. The method of claim 1 wherein said front and rear cover sheets are fastened to said backing by gluing.

4. The method of claim 1 wherein said back sheet is provided with reinforcing means.

5. The method of claim 1 wherein said back sheet is made of synthetic material.

6. The method of claim 1 wherein said back sheet is made of kraft paper.

7. A method according to claim 1 further comprising cutting the front and rear cover sheets together with the bound document sheets to a suitable dimension after 8. A method according to claim 1 wherein the thickness of said bundle of document sheets is less than the spacing between the rear edges of said front and rear cover sheets and the rear edge of at least one of said cover sheets is disposed forward of the rear edges of said document sheets in the bound set of documents.

9. A method according to claim 1 wherein said backing comprises profiled ribs which define flexible points on said backing, and said backing is wrapped around the edge of said bundle such that the backing bends around the corner of said bundle at one of said flexible points.

* * * * *